United States Patent [19]

Jahoda

[11] 4,369,747
[45] Jan. 25, 1983

[54] METHOD OF AND APPARATUS FOR PREPARATION OF A COMBUSTION MIXTURE FOR ENGINES WITH DIVIDED COMBUSTION SPACE

[75] Inventor: Stanislav Jahoda, Horni Pocernice, Czechoslovakia

[73] Assignee: Ustav pro vyzkum motorovych vozidel, Prague, Czechoslovakia

[21] Appl. No.: 125,514

[22] Filed: Feb. 28, 1980

[51] Int. Cl.³ .......................... F02B 17/00; F01L 3/22
[52] U.S. Cl. .................................... 123/278; 123/531; 123/258
[58] Field of Search ............... 123/274, 275, 277, 278, 123/531, 286, 258, 288

[56] References Cited

U.S. PATENT DOCUMENTS

| | | | |
|---|---|---|---|
| 3,982,504 | 9/1976 | Noguchi | 123/277 |
| 4,036,202 | 7/1977 | Weslake | 123/275 |
| 4,216,753 | 8/1980 | Inoue | 123/531 |

Primary Examiner—Charles J. Myhre
Assistant Examiner—Carl Stuart Miller

[57] ABSTRACT

Method of and apparatus for preparation of a combustible mixture of different mixing ration for a main combustion chamber and for a subsidiary combustion chamber for an internal combustion engine. In such apparatus there are a main suction channel terminating into the main combustion chamber and a subsidiary suction channel terminating into the subsidiary combustion chamber, both combustion chambers being separated from their suction channels by suction valves. The fuel is injected via an injection nozzle into the suction tract of the engine and the formed combustible mixture is sucked into the main combustion space of the engine. Simultaneously a part of the fuel is taken away from the injected fuel jet by a stream of sucked-in air, forming a combustible mixture which is sucked into the subsidiary combustion chamber of the combustion engine.

12 Claims, 7 Drawing Figures

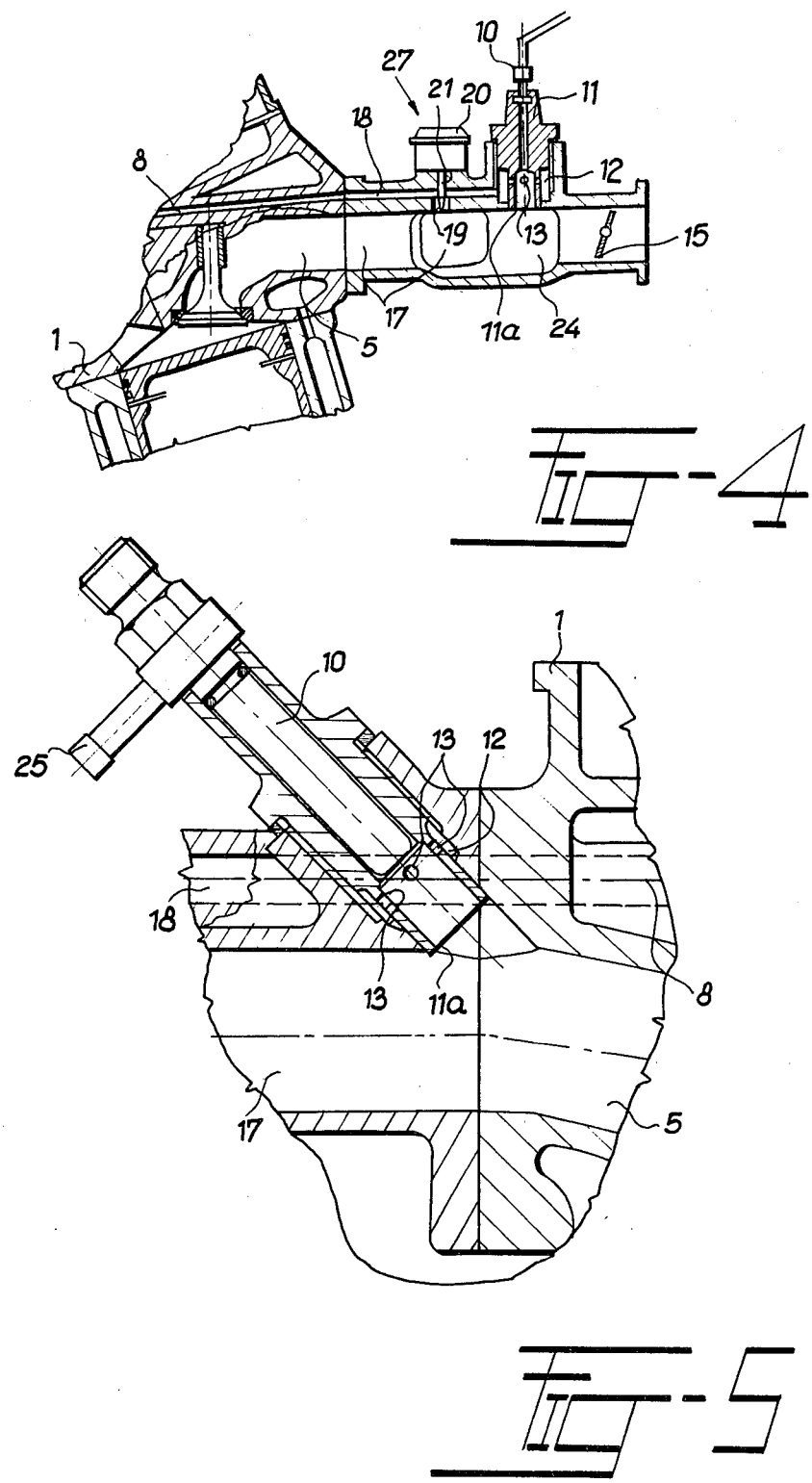

METHOD OF AND APPARATUS FOR PREPARATION OF A COMBUSTION MIXTURE FOR ENGINES WITH DIVIDED COMBUSTION SPACE

BACKGROUND OF THE INVENTION

This application is related to the prior copending application, Ser. No. 06/108,322, still pending, filed Dec. 28, 1979, by the same inventor. Such prior application is incorporated herein by reference in its entirety.

The invention relates to internal combustion engines with reciprocating or rotating movement of pistons and a divided combustion space, and particularly to a method of preparation of a combustible mixture for such engines and to an apparatus for practicing this method.

Engines with a divided combustion space, wherein in addition to a main combustion space a subsidiary combustion space connected therewith is provided, are known. In such engines a main suction channel controlled by a main suction valve terminates into the main combustion space, from which a discharge channel, controlled by a discharge valve, branches. A subsidiary suction channel controlled by a subsidiary suction valve terminates into the subsidiary combustion chamber, the subsidiary chamber being connected with the main combustion chamber by a flash-over channel. A spark plug or some other means for igniting the combustible mixture is disposed in the subsidiary combustion chamber. In such priors engines, poor or lean combustible mixture is supplied to the main combustion chamber and an easily ignitable richer combustible mixture is supplied to the subsidiary combustion chamber. The spark plug ignites the combustible mixture in the subsidiary chamber when the piston associated with such chambers is in the neighborhood of the upper dead end of its compression stroke. The hot gases flash-over from the subsidiary combustion chamber via a flash-over channel into the main combustions chamber and ignite the poor or lean combustible mixture therein.

It is also known that for the correct operation of the above-described method two combustible mixtures with different air-fuel mixing ratios have to be provided, a poor mixture for the main combustion chamber and a rich one for the subsidiary combustion chamber. For the preparation of both kinds of combustible mixtures known designs of similar engines use two separate devices, either two separate carburetors, the control of which is accomplished, for instance, according to U.S. Pat. No. 1,568,638; 2,121,920; 3,092,088; 3,230,939; and 3,880,942, or according to German Pat. No. 2,259,286 and others, or by a combination of a carburetor and an injection device, used for instance in Honda and Volkswagen engines. A drawback of these known arrangements is the requirement following from the design of the use of two of either the same or different devices, and also their dependent control requiring substantially complicated mechanical or other devices.

It is an object of this invention to provide a method of preparation of a combustible mixture of fuels of different air-fuel mixing ratios, and an arrangement for practicing this method, which are simple, reliable and permit a simple control of the mixing ratios of both kinds of combustible mixtures and which eliminate the drawbacks of known arrangements.

The method of preparation of a combustible mixture with different mixing ratios for the main and subsidiary combustion chamber for internal combustion engines with a divided combustion space according to this invention has been solved by forming the combustible mixtures for both combustion chambers from a single fuel jet which is injected into the main air stream sucked into the main combustion chamber, a part of the fuel being separated from the fuel jet by a subsidiary air stream which is sucked into the subsidiary chamber.

The combustible mixture for the subsidiary combustion chamber according to this invention is furthermore adjusted by a supply of additional air which is advantageously taken from the main stream of sucked-in air. The subsidiary stream of sucked-in air can be taken from the main stream of sucked-in air. For carrying out the method according to this invention an arrangement is provided wherein part of the fuel is sucked into the subsidiary chamber and is furthermore adjusted by the supply of additional air thereto. For this purpose, a stub nipple encompassing the fuel jet is open into the main suction channel, to the main suction conduit, or to the mixing chamber of suction conduits.

It is advantageous to connect the sucking-off chamber with the main suction conduit by a channel for additional air, or to connect it both with the main suction channel and with the main suction conduit, by an annular passage around said stub nipple. The channel for additional air can be connected with the main suction conduit by an opening into which a conical end of a regulating screw protrudes, or it can be connected by an air chamber with the suction tract of the engine, whereby the throttling cone of the regulator of additional air engages into the air chamber.

An air chamber for additional air can be provided in the channel for additional air.

A throttline flap may be provided in the mains suction conduit upstream of the collecting conduit of the main suction conduit.

A throttling glap can be furthermore provided in the main suction conduit upstream of the mixing chamber.

The solution according to this invention provides for an engine with a divided combustion space the advantage of a perfectly prepared combustible mixture with two mixing ratios by the use of a single injection device of any system, for instance with low, medium or high pressure, with continuous or intermittent ejection.

The main advantage of this solution over known arrangements is mainly the more perfect maintenance of the same mixing ratio of the combustible mixture and its distribution to individual cylinders, enabling the achievement for an equal mixing ratio of the combustible mixture lower values of the content of harmful substances particularly of nitrogen oxide in the engine exhaust gases, and providing the possibility to achieve a higher specific output with a simple design without the requirement of extraordinary and costly arrangements of the combustion system.

DESCRIPTION OF DRAWINGS

The invention will be described and explained in more detail in examplary embodiments shown in the attached drawings, wherein:

FIG. 4 is a sectional elevation of a fourth embodiment having an arrangement of the suction system with fuel injection into a single place of the suction conduit of a multicylinder engine; and FIGS. 5, 6, and 7 are diagrammatic sectional elevations of fifth, sixth, and seventh embodiments, such figures showing alternatives of the design of the sucking-off chamber according to this invention with an injection nozzle.

DESCRIPTION OF PREFERRED EMBODIMENTS

Figure 1:
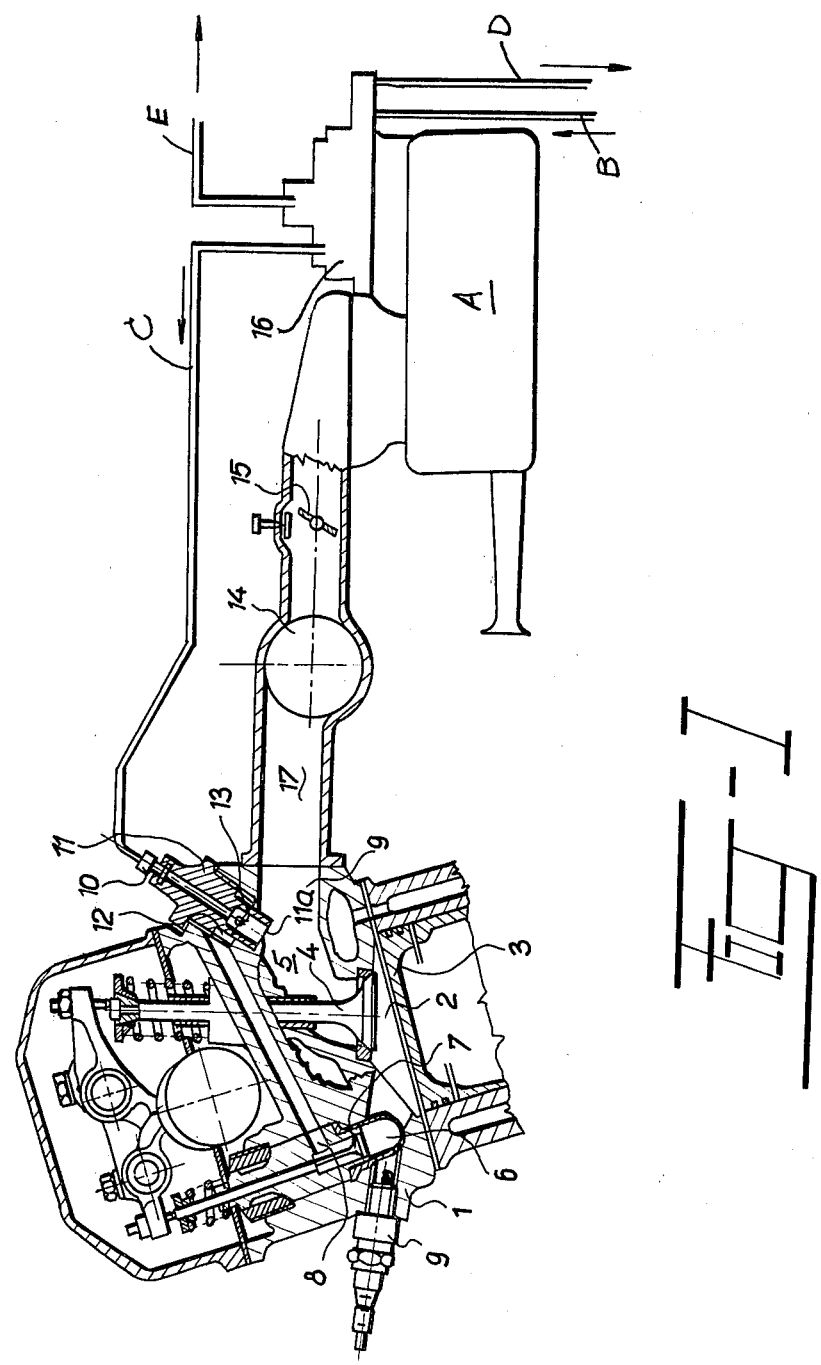
FIG. 1 is a sectional elevation of a first arrangement according to this invention shown in connection with a single cylinder of an engine.

FIG. 1 shows the fundamental arrangement according to this invention provided on a single or multicylinder ignition engine. The engine is provided with an air cleaner A and a fuel pump 16 which forwards liquid fuel through a conduit C to a fuel injection nozzle 10 for the single cylinder shown. Fuel is supplied to the pump 16 from a source of supply such as a fuel tank (not shown) through a conduit B. Fuel in excess of the requirements of the engine is returned from pump 16 to the source of fuel supply through a conduit D, or a conduit E, or both.

The engine has a main combustion chamber 2 with a cylinder head 1, the cylinder being closed by the face wall 3 of the piston, possibly also by the wall of the engine cylinder. A main suction channel or mixing chamber 5 controlled by a main suction valve 4 terminates into the main combustion chamber 2. A subsidiary combustion chamber 6 is connected with the main combustion chamber 2 by means of a flash-over channel, into which subsidiary combustion chamber 6 a subsidiary suction channel 8 controlled by a subsidiary suction vale 7 terminates. Valves 4 and 7 are operated in timed relationship with the piston by cams on the engine camshaft operating through rocker arms, as shown. A spark plug 9 is provided in the subsidiary combustion chamber 6. A main suction conduit 17 terminating into a collecting conduit 14 is connected with the main suction channel 5, to which collecting conduit 14 a body with a throttling flap or butterfly valve 15, a regulator 16 of the amount of fuel, and further parts of the suction system of the engine are connected. A holder 11 of a fuel injection nozzle 10, provided with a stub nipple 11a is provided in the cylinder head 1, which stub nipple 11a forms with the cylinder head 1 a sucking-off chamber 12, connected with the main suction channel 5 by openings 13 arranged in the stup nipple 11a. The sucking-off chamber 12 is connected by a subsidiary suction channel 8 in the cylinder head with the subsidiary combustion chamber 6.

The arrangement according to FIG. 1 operates as follows.

An amount of fuel which together with the sucked-in amount of air forms a mixture of the required overall mixing ratio supplied via the fuel injection nozzle 10. Due to thermodynamic changes in the ejected fuel jet, its most easily evaporating components are released in the neighborhood of the mouth of the fuel injection nozzle 10 which components together with the most fully atomized fuel, due to the stream generated in the stub nipple 11a by the injected fuel jet and by sucking off by the subsidiary suction chamber 6. This combustible mixture has a minimum tendency to condense on the walls of the subsidiary suction channel 8. As for sucking in of a fresh fuel dosis of the combustible mixture into the engine, the same limit conditions prevail as in the main and subsidiary suction channels, the ratios of sucked-in amounts of combustible mixtures into both combustion chambers 2, 6 depend on the hydrodynamic properties of both systems. These can be chosen so that the ratios of both amounts of combustible air-fuel mixtures decrease with an increase in the load upon the engine and increases upon a decrease of engine load. It has been observed that the degree of distribution of combustible mixtures, expressed by the ratio of fuel supplied into the combustible mixture into the subsidiary combustion chamber 6 to the amount of fuel in the combustible mixture supplied into the main combustion chamber 2 depends only slightly upon speed.

The mixing ratio of the combustible mixture in the subsidiary combustion chamber 6 can be controlled over a wide range by the size of the stub nipple 11a, by the diameter of openings 13, by the size of supply conduits, or by the auxiliary air which is taken along, according to need from the suction system between the stub nipple 11a and the air cleaner and introduced into the subsidiary suction channel 8. The selection of these values depends on the injection device used. In case of any change of the air-fuel ratio and amount of the combustible mixture for the subsidiary combustion chamber 6, the overall mixing ratio of the combustible mixture remains a function of the fundamental adjustment of the injection device.

In order to secure a good operation of the arrangement it is advantageous from the point of view of preparation of the combustible mixture to use for a more perfect atomization of the fuel jet the subsidiary air supplied from the space in front of the throttling flap 15 to the mouth of the injection nozzle 10, particularly for the subsidiary combustion chamber 6 at low engine load and when using low pressure injection devices. The amount of air depends on the magnitude of underpressure in the suction conduit 17 behind the throttling valve 15 and on the magnitude of the cross section at the place of its outlet near the fuel nozzles 10. As the pressure difference in the outlet cross section of air is critical from a certain engine load on, the atomizing of fuel by this method is rather efficient. The intensity of evaporation and the stability of the combustible mixture sucked off into the subsidiary combustion chamber 6 depends on the atomizing of fuel. In a limiting case the amount of air can be the amount which is required for the idle running of the engine.

As above noted, further embodiments of the apparatus are shown in FIGS. 2-7 incl. Parts which are the same as or similar to those in FIG. 1 are designated by the same reference characters.

Figure 2:
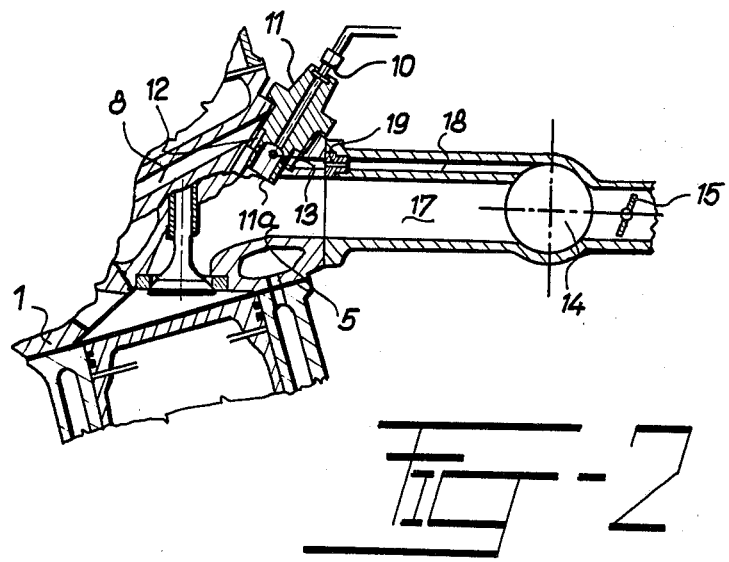
FIG. 2 is a partial sectional elevation of a second embodiment of the suction system of the engine, such system providing for the supply of additional air.

FIG. 2 shows an arrangement, where a channel 18 for additional air terminating for instance into the collecting conduit 14, is connected to the subsidiary suction channel 8. The air chamber 19 for additional air can be either a single one for all engine cylinders or be separate for each cylinder. The channel 18 for additional air enables the adjustment of the mixing ratio of the combustible mixture for the subsidiary combustion chamber 6 and together with openings 13 its amount.

Figure 3:
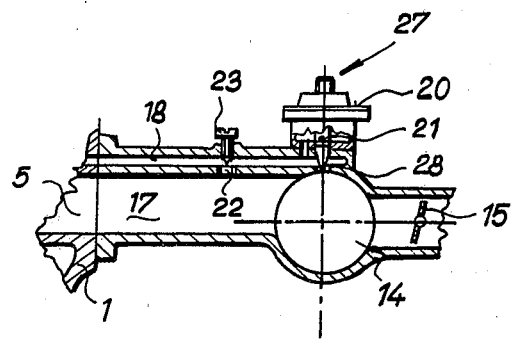
FIG. 3 is a diagrammatic sectional elevation of a third embodiment having an adjustable air chamber for supplying additional air.

FIG. 3 shows an examplary embodiment of a regulator 27 of additional air arranged in the channel 18 for additional air, the throughflow section of which is controlled in dependence on the operating conditions of the engine. A control device 20 actuates for instance in dependence on the engine load the throttling cone 21 and changes thus the throughflow cross section of the air chamber 28 for additional air. An opening provided in the wall of the suction conduit, controlled by a regulating screw 23 serves for fine adjustment of the amount of additional air.

FIG. 4 shows an arrangement of a multicylinder engine, where the fuel injection into the suction conduit 17 is accomplished by a single fuel injection nozzle 10 for all engine cylinders. Nozzle 10 is connected to a source of high pressure air by a conduit, a portion of which is shown at 25. Such high pressure air serves for a better atomization of the jet of fuel issuing from the nozzle 10.

The fuel injection nozzle 10 arranged in the holder 11 injects fuel into the mixing chamber 24 of a common suction conduit, wherefrom the combustible mixture is distributed to individual engine cylinders by respective branches of the suction conduit 17. The holder 11 forms by means of the stub nipple 11a in its seating a sucking-off chamber 12 which is connected both by openings 13 with the suction conduit 17 and by the channel 18 for additional air with the subsidiary suction channel 8. The rich mixture for the subsidiary combustion chamber 6 is taken by this arrangement from a single place. A possible adjustment of the mixing ratio can be equally accomplished by a single device.

FIG. 5 shows an example of a design of the holder 11 with the stub nipple 11a with the fuel nozzle 10 and the situation of the holder 11 in the suction conduit 17 for creation of a sucking-off chamber 12. The fuel injection nozzle 10 terminates into the internal space of the stub nipple 11a.

Close to the mouth of the fuel injection nozzle 10 openings 13 are provided, by means of which the sucking-off chamber 12 is connected with the suction conduit 17. The sucking-off chamber 12 is also connected with the subsidiary suction channel 8. A channel 18 for additional air enabling without great difficulties the adjustment of the mixing ratio of the combustible mixture according to requirements of operation of the engine is arranged parallel or in series with the sucking-off chamber 12. The mixing ratio of the combustible mixture for the subsidiary combustion chamber 12 can be adjusted by additional air also with regard to operating conditions of the engine.

Figure 6:
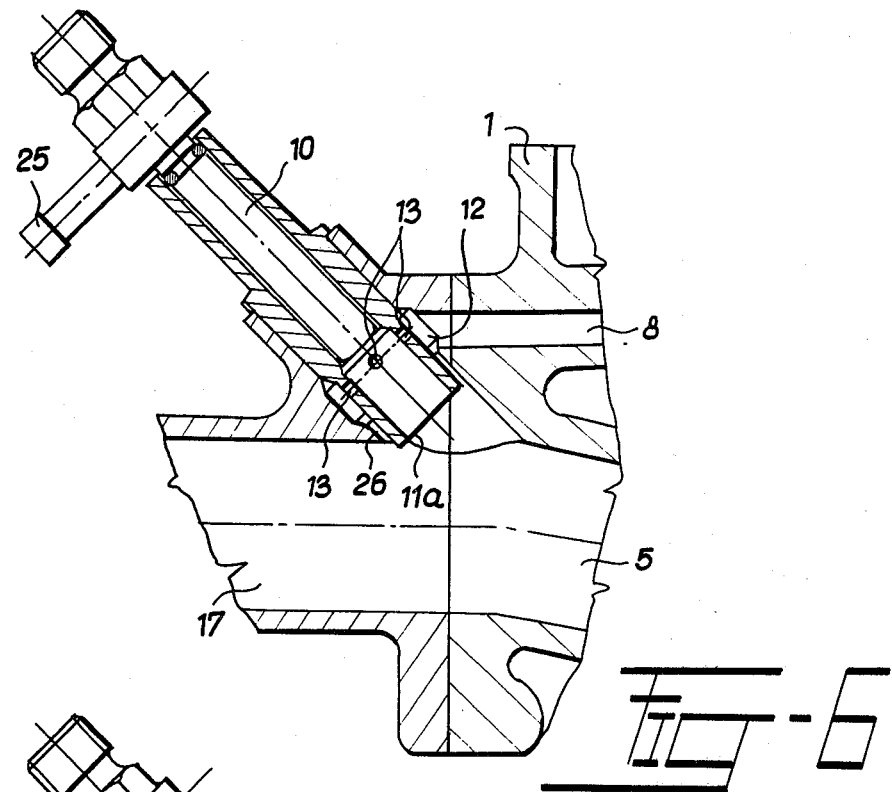

FIG. 6 shows an alternative solution according to this invention by pressing-in the holder 11 into a bore of a neck of the cylinder head 1 of the engine cylinder or of the suction conduit 17. Additional air passes via an annular passage 26 between the external wall of the stub nipple 11a and the bore of this neck.

Figure 7:
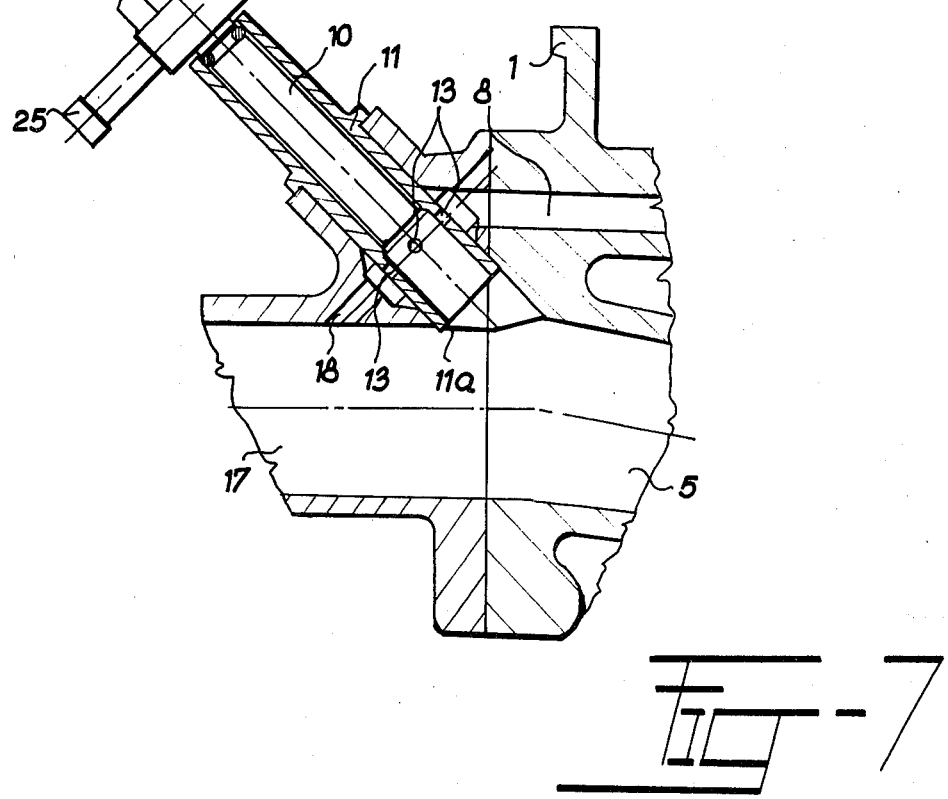

FIG. 7 shows a similar solution as in FIG. 6 with the difference, that additional air is supplied to the sucking-off chamber 12 over the channel 18 for additional air, terminating in an inclined direction into the suction chamber 17.

It is to be noted that in each of FIGS. 5, 6, and 7, a high pressure air conduit is connected to the nozzle 10 as in FIG. 4. The manner of operation of each of the embodiments of FIGS. 2–7, incl., will be apparent from the above description of them and from the detailed description of the manner of operation of the arrangement of FIG. 1.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

I claim:

1. In an apparatus for preparing combustible mixtures with different air-fuel mixing ratios for an internal combustion engine having a main combustion chamber with a main suction channel and a subsidiary combustion chamber with a subsidiary suction channel, the improvement which comprises a suction valve provided in each of the main and the subsidiary suction channels, the main suction channel forming part of the suction tract of the engine, a fuel nozzle generating a fuel jet terminating into the suction tract of the engine, a stub nipple encompassing the outlet of said fuel nozzle while remaining open into the suction tract of the engine, a sucking-off chamber provided around said stub nipple, openings formed in said stub nipple near the outlet of the fuel injection nozzle connecting the internal space of the stub nipple with the sucking-off chamber, the subsidiary suction channel connecting this sucking-off chamber with the subsidiary combustion chamber, means for igniting the combustible mixture in the subsidiary chamber, and a flashover channel connecting the subsidiary combustion chamber with the main combustion chamber.

2. An arrangement as claimed in claim 1, wherein the stub nipple of the fuel injection nozzle terminates into the main suction channel.

3. An arrangement as claimed in claim 1, wherein the stub nipple of the fuel injection nozzle terminates into a suction conduit which is part of the suction tract of the engine.

4. An arrangement as claimed in claim 1, comprising a mixing chamber for the suction conduits, the stub nipple terminating into the mixing chamber.

5. An arrangement as claimed in claim 1, comprising a channel for additional air connecting the sucking-off chamber with the main suction conduit.

6. An arrangement as claimed in claim 1, comprising means providing an annular passage around the stub nipple of the fuel injection nozzle, said annular passage connectingd the sucking-off chamber with both the main suction channel and the main suction conduit.

7. An arrangement as claimed in claim 1, comprising a channel for additional air provided with an opening and a conical end of a regulating screw engaging into this opening, said opening connecting said channel for additional air with the main suction conduit.

8. An arrangement as claimed in claim 1, comprising a channel for additional air, an air chamber, a regulator of additional air, and a throttling cone engaging into the air chamber, the channel for additional air being connected with said air chamber.

9. An arrangement as claimed in claim 1, comprising a channel for additional air, and an air chamber in said channel.

10. An arrangement as claimed in claim 1, comprising a main suction conduit and a collecting conduit of said suction conduits and throttling means provided in the main suction conduit upstream of the collecting conduit of the suction conduits.

11. An arrangement as claimed in claim 10, wherein a throttling flap forms said throttling means.

12. An arrangement as claimed in claim 1, comprising a mixing chamber forming part of the suction tract of the engine, a main suction conduit connected to this mixing chamber, and a throttling flap provided in said main suction conduit upstream of said mixing chamber.

* * * * *